(No Model.)

2 Sheets—Sheet 1.

W. MADISON.
Wood Shaping Machine.

No. 240,832.  Patented May 3, 1881.

Witnesses:
Will. H. Davis.
Alex. Scott

Inventor:
Wm. Madison
by J. J. Greenough Atty (No Model.) 2 Sheets—Sheet 2.

W. MADISON.
Wood Shaping Machine.

No. 240,832. Patented May 3, 1881.

Witnesses:
Will. H. Davis
Alex. Scott

Inventor:
Wm Madison
by J.J. Greenough
Atty.

UNITED STATES PATENT OFFICE.

WILLIAM MADISON, OF CANASTOTA, NEW YORK, ASSIGNOR OF ONE-HALF TO WINSLOW MASON, OF SAME PLACE.

WOOD-SHAPING MACHINE.

SPECIFICATION forming part of Letters Patent No. 240,832, dated May 3, 1881.

Application filed January 28, 1881. (No model.)

*To all whom it may concern:*

Be it known that I, WILLIAM MADISON, of Canastota, Madison county, in the State of New York, have invented certain Improvements in Wood Shaping and Molding Machinery for Carriages and other Purposes, of which the following is a specification.

The properly shaping and molding of the bars, &c., in the running-gear of carriages and for other purposes has heretofore been a matter of great difficulty, and the many attempts to perform the work by machinery unsuccessful, and where hard woods were used, (best adapted to the purpose,) such as iron-wood, the use of all the machinery heretofore devised has been attended with danger, especially where there were knots or crooked-grained wood, the result being less perfect and expeditious than working the same in my machine, where the work is performed with perfect safety to the operator and much cheaper.

The construction of my machine is as follows, referring to the accompanying drawings, in which—

Figure 2:
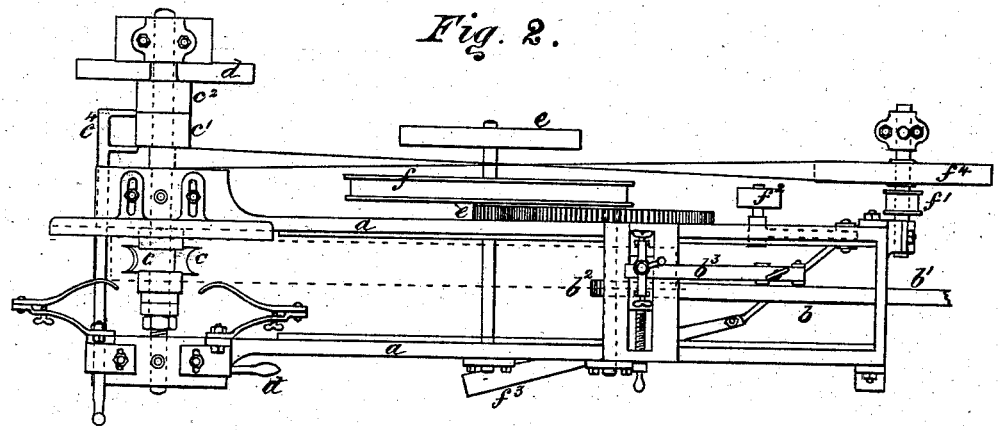
Figure 1:
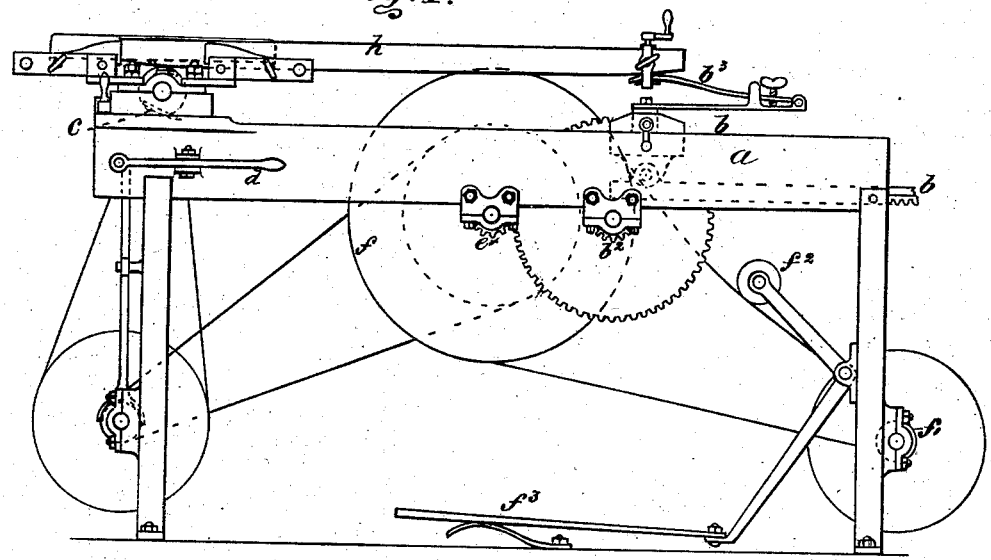
Figure 3:
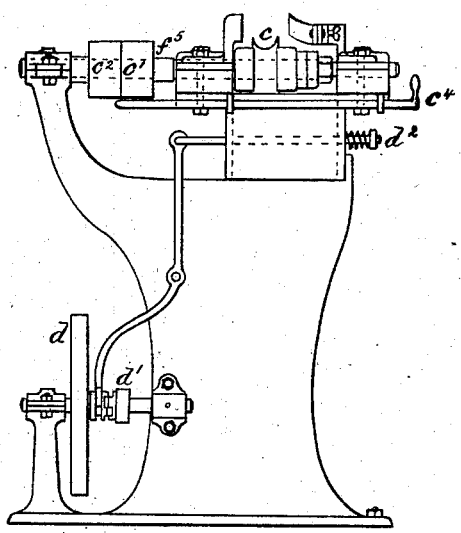
Figure 4:
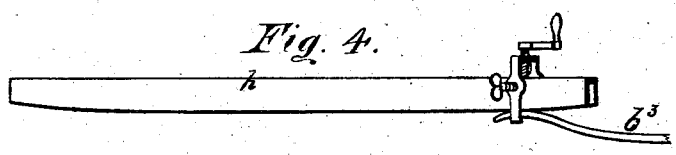
Figure 5:

Figure 1 is a side elevation of the entire machine. Fig. 2 is a top plan of the same. Fig. 3 is an end view of the front end. Fig. 4 represents the self-feeding shaper detached; Fig. 5, the rounding-knife detached.

The frame of my machine consists of two parallel slideways, $a$, firmly united at the ends, between which the feed-carriage $b$ slides, and is moved forward and back by a rack, $b'$, and pinion $b^2$. Near the front end of ways $a$ the cutter-head $c$ is hung, the shaft of which extends beyond the ways, with an end bearing in the front standard of the frame. (See Fig. 3.) On this shaft there is a fast pulley, $c'$, and loose pulley $c^2$, the latter being double and of two diameters, one the size of the fast pulley, the other smaller. They are alternately driven by a shifting-belt from the motor. When this belt is on the fast pulley it drives the cutter-head. When shifted to the loose pulley $c^2$ it drives the backing mechanism of the carriage $b$ by means of a belt running on the smaller diameter of the loose pulley $c^2$ and the pulley $d$ on a shaft below, on which there is a loose pulley, $d'$, which can be coupled with the shaft by a clutch connected with a hand-lever, $d^2$, in front of the frame. Pulley $d'$ is connected by a belt with pulley $e$ on the shaft of pinion $e'$, gearing into a spur-wheel on the shaft of pinion $b^2$, that moves the rack and carriage $b$ and causes it to recede. On the shaft of pulley $e$ there is a larger pulley, $f$, driven by a belt from a small pulley, $f'$, on a shaft located at the rear standard of the frame. This belt runs loose, and is brought into action to drive pulley $f$ by an idler-pulley, $f^2$, on an arm actuated by a treadle, $f^3$, below. Pulley $f'$ is driven by pulley $f^4$, connected by a cross-belt with pulley $f^5$ on the cutter-shaft, which reduces the motion properly to feed carriage $b$ forward with the material to be worked. The belt from the prime mover is shifted by the shipper $c^4$. The knives in the cutter-head are beveled on the back and shaped to cut the round or other form desired, and are flat on the face, as seen in Fig. 5. They are fitted and held in grooves in the collars of the cutter-head $c$. On one side of this cutter-head a gage, $g$, is affixed to the frame, so as to be set to or from the collar, to guide the shaper and hold it in place laterally. On the opposite side there is a leaf-spring, $g'$, that holds the shaper against the gage, keeping it in place laterally.

The feeding-carriage $b$, moving to and from the cutter-head by the devices heretofore described, has a stout leaf-spring, $b^3$, projecting forward, to the front end of which a stirrup or collar is affixed, that receives and holds the rear end of the automatic feeding-shaper $h$, which is adjusted and held therein by set-screws in the top and sides of the stirrup. The shaper, which is one of the most important features of the invention, is composed of two side pieces properly united at each end, shaped on their under side, which rests on the collars of the cutter-head, to conform to the linear figure of the piece to be shaped, which is firmly secured in the self-feeding shaper, between them. The forward end of the shaper is then brought over the knives and entered between the gage and spring until it rests on the cutter-heads and regulates the proper presentation of the piece to the cutters that shape it into form. If at any point it becomes desirable to lift the piece from the action of the cutters other than is done by the shaper, it is readily raised by the hand of the operator. By this means the piece is accurately presented to the cutters, while it is firmly and securely held in place, so as to prevent its being shivered or thrown out, by which all danger of accident to the operator, spectator, or machine is avoided. If the piece to be wrought is curved, the spring $b^3$ and its stirrup is left free to move up and down, the work being drawn down by the knives; but if a straight bar is to be cut the spring may be wedged above and below, so as to hold it stiff. By the undercutting of the work the chips are thrown downward, freeing the machine from them, while they can be discharged below.

Having thus fully described my improved machinery for shaping and molding wood-work, I claim—

1. In combination with the revolving cutter-head, the shaper $h$, constructed as herein described, and connected with a sliding carriage, substantially as set forth, for guiding and holding the material to be cut, constructed, arranged, and operating as and for the purposes specified.

2. The combination of the self-feeding shaper $h$ and sliding carriage $b$ by means of the spring $b^3$, substantially in the manner and for the purposes described.

3. In wood-shaping machinery, as herein described, the combination of the self-feeding shaper $h$ with the adjustable gage $g$ and spring $g'$, for keeping the shaper in line laterally, with freedom to be raised and lowered by the operator, as and for the purposes specified.

WM. MADISON.

Witnesses:
C. L. HOBART,
LE GRAND COLTON.